US012453814B2

(12) United States Patent
Bao et al.

(10) Patent No.: US 12,453,814 B2
(45) Date of Patent: Oct. 28, 2025

(54) APPARATUS AND METHODS FOR MEDICAL APPLICATIONS OF LASER DRIVEN MICROFLUID PUMPS

(71) Applicant: University of Houston System, Houston, TX (US)

(72) Inventors: Jiming Bao, Pearland, TX (US); Wei-Kan Chu, Houston, TX (US); Feng Lin, Houston, TX (US); Shuai Yue, Pearland, TX (US); Di Chen, Houston, TX (US); Dennis McWilliams, Austin, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 994 days.

(21) Appl. No.: 17/612,391

(22) PCT Filed: May 20, 2020

(86) PCT No.: PCT/US2020/033823
§ 371 (c)(1),
(2) Date: Nov. 18, 2021

(87) PCT Pub. No.: WO2020/242860
PCT Pub. Date: Dec. 3, 2020

(65) Prior Publication Data
US 2022/0218896 A1     Jul. 14, 2022

Related U.S. Application Data

(60) Provisional application No. 62/852,485, filed on May 24, 2019.

(51) Int. Cl.
*A61M 5/142*       (2006.01)
*A61B 17/3203*    (2006.01)
*F04F 7/00*         (2006.01)

(52) U.S. Cl.
CPC ..... *A61M 5/14212* (2013.01); *A61B 17/3203* (2013.01); *A61B 17/32037* (2013.01); *F04F 7/00* (2013.01); *A61M 2205/02* (2013.01)

(58) Field of Classification Search
None
See application file for complete search history.

(56) References Cited

U.S. PATENT DOCUMENTS

| | | | |
|---|---|---|---|
| 6,210,128 | B1 | 4/2001 | Rife et al. |
| 6,913,605 | B2 | 7/2005 | Fletcher et al. |
| 7,798,164 | B2 | 9/2010 | Adleman et al. |
| 2001/0055435 | A1 | 12/2001 | Biagi et al. |
| 2010/0152644 | A1* | 6/2010 | Pesach .............. A61M 5/14244 604/20 |
| 2012/0023234 | A1 | 1/2012 | Martin |
| 2012/0232341 | A1 | 9/2012 | Seto et al. |
| 2018/0238358 | A1 | 8/2018 | Bao et al. |
| 2019/0091683 | A1 | 3/2019 | Baudoin et al. |

FOREIGN PATENT DOCUMENTS

| | | |
|---|---|---|
| CN | 104383621 A | 3/2015 |
| JP | 2000279852 A | 10/2000 |
| JP | 2003111766 A | 4/2003 |
| JP | 2007209465 A | 8/2007 |
| JP | 2014526909 A | 10/2014 |
| WO | 2012144916 A2 | 10/2012 |

OTHER PUBLICATIONS

International Preliminary Report on Patentability issued by the International bureau of WIPO in connection with International Application No. PCT/US2020/033823, dated Nov. 16, 2021.
International Search Report and Written Opinion issued by the International Searching Authority/US in connection with International Application No. PCT/US20/33823, dated Aug. 25, 2020.
Shuai Yue, et al., "Gold-implanted plasmonic quartz plate as a launch pad for laser-driven photoacoustic microfluidic pumps", PNAS, vol. 116, No. 4, Apr. 2, 2019, pp. 1-6.
Chinese Office Action received by the China National Intellectual Property Administration in connection with International Application No. 202080051526.6, dated Jun. 27, 2023.
Japanese Decision of Refusal issued by the Japanese Patent Office in connection with International Application No. 2021-569425, dated Dec. 20, 2023. (Translation).
Chinese Office Action/Notice of Rejection issued by the Chinese Patent Office (CIPO) in connection with International Application No. 202080051526.6, dated Jun. 1, 2024. English Translation Attached.
Japanese Office Action issued by the Japanese Patent Office in connection with Japanese Patent Application No. 2021-569425, dated Dec. 6, 2022. (English Translation Attached).
Extended European Search Report issued by the European Patent Office in connection with International Application No. 20813277.9, dated Aug. 22, 2023.
Chinese Office Action issued by the Chinese Patent Office (CIPO) in connection with International Application No. 202080051526.6, dated Feb. 18, 2024.

(Continued)

*Primary Examiner* — Teresa E Knight
(74) *Attorney, Agent, or Firm* — George Likourezos; Carter, DeLuca & Farrell LLP

(57) ABSTRACT

An apparatus for drug delivery is presented in accordance with aspects of the present disclosure. The apparatus includes a laser-driven photoacoustic microfluid pump (LDMP), an open tube capillary including a first end and a second end; the first end disposed on the LDMP, the open tube capillary configured to store a drug. The LDMP is configured to generate a fluidic jet from the drug and deliver the drug.

4 Claims, 19 Drawing Sheets

(56) References Cited

OTHER PUBLICATIONS

Japanese Office Action issued by the Japanese Patent Office in connection with International Application No. JP 2021-569425, dated Jun. 27, 2023. (English Translation).

* cited by examiner

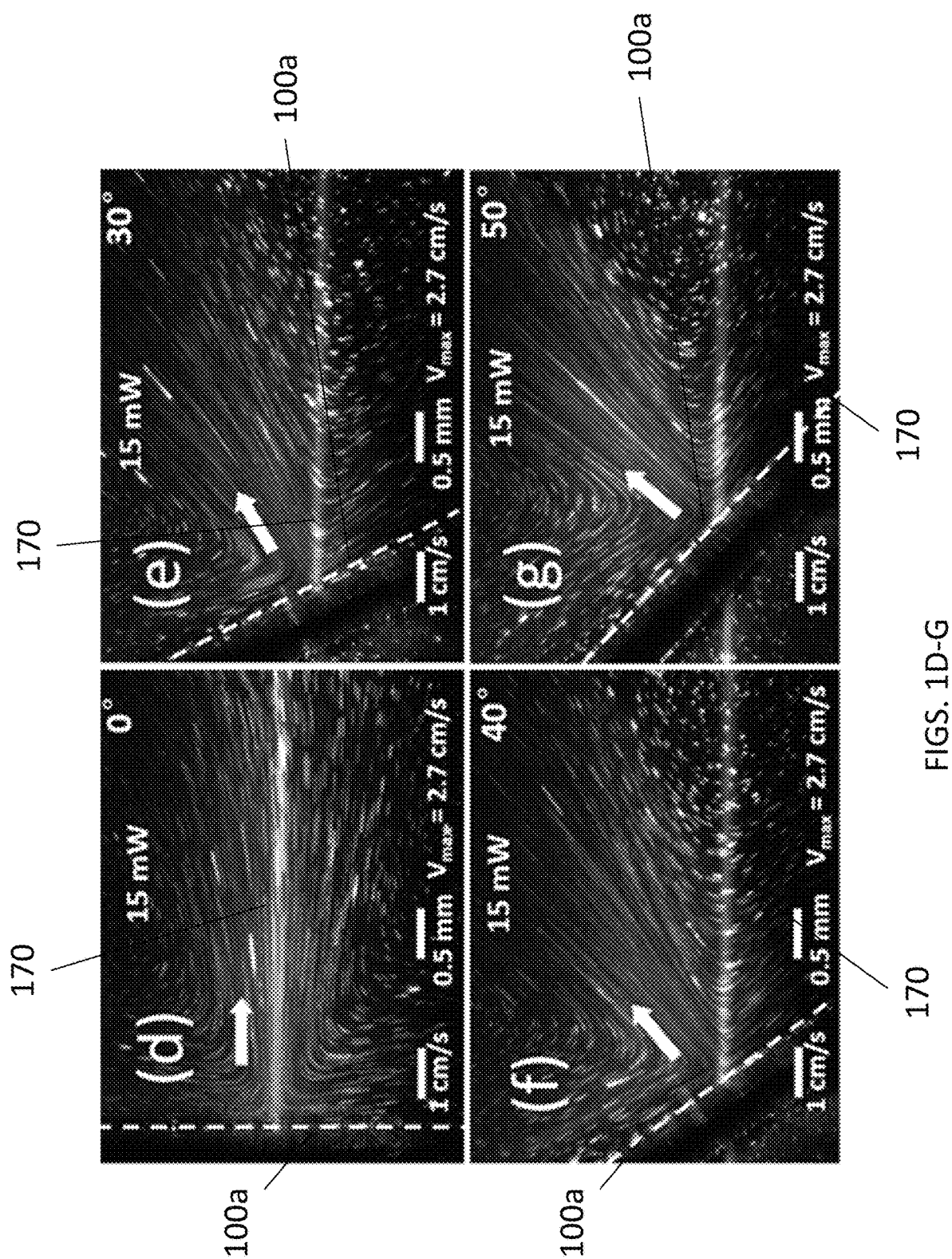
FIGS. 1D-G

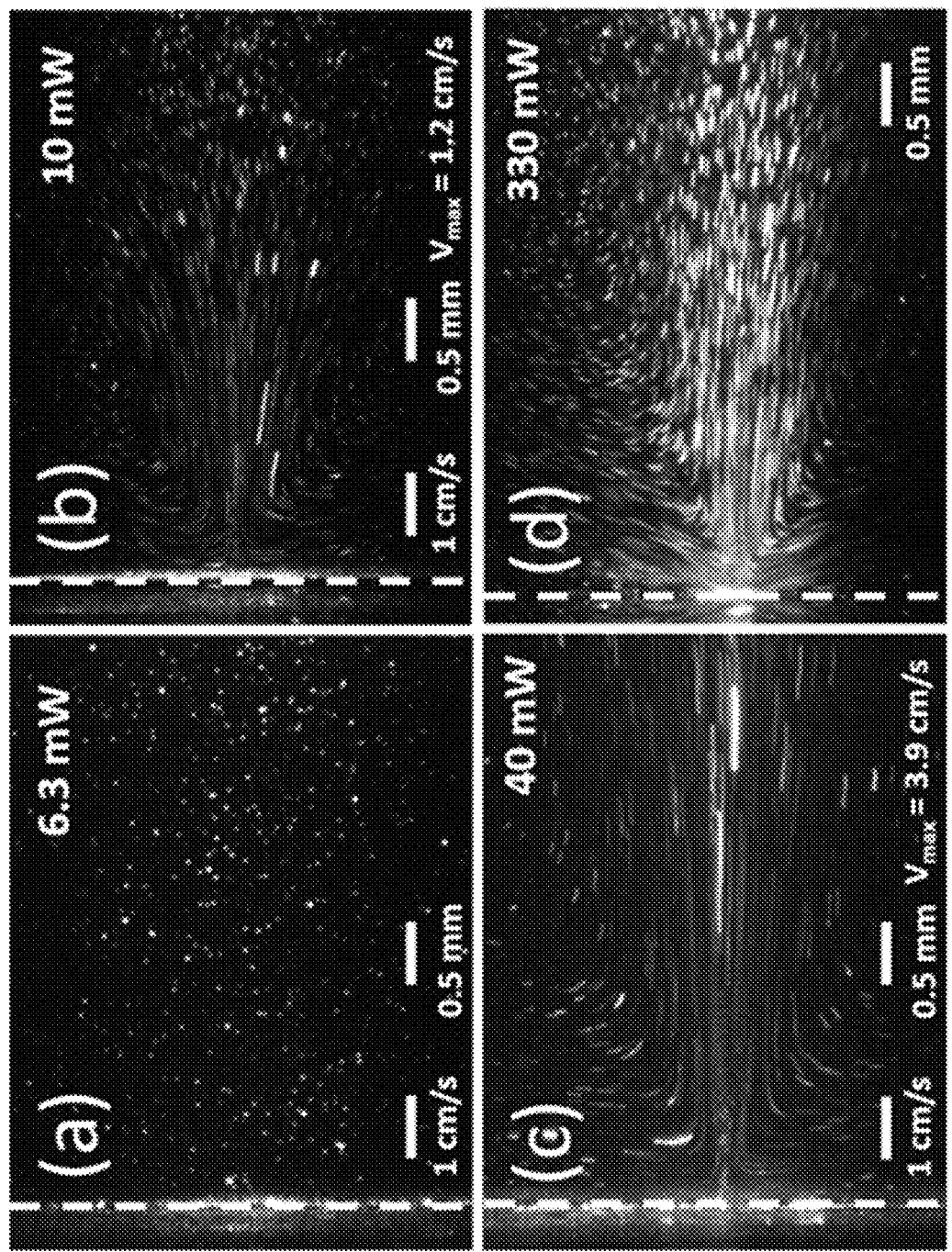
FIGS. 2A-D

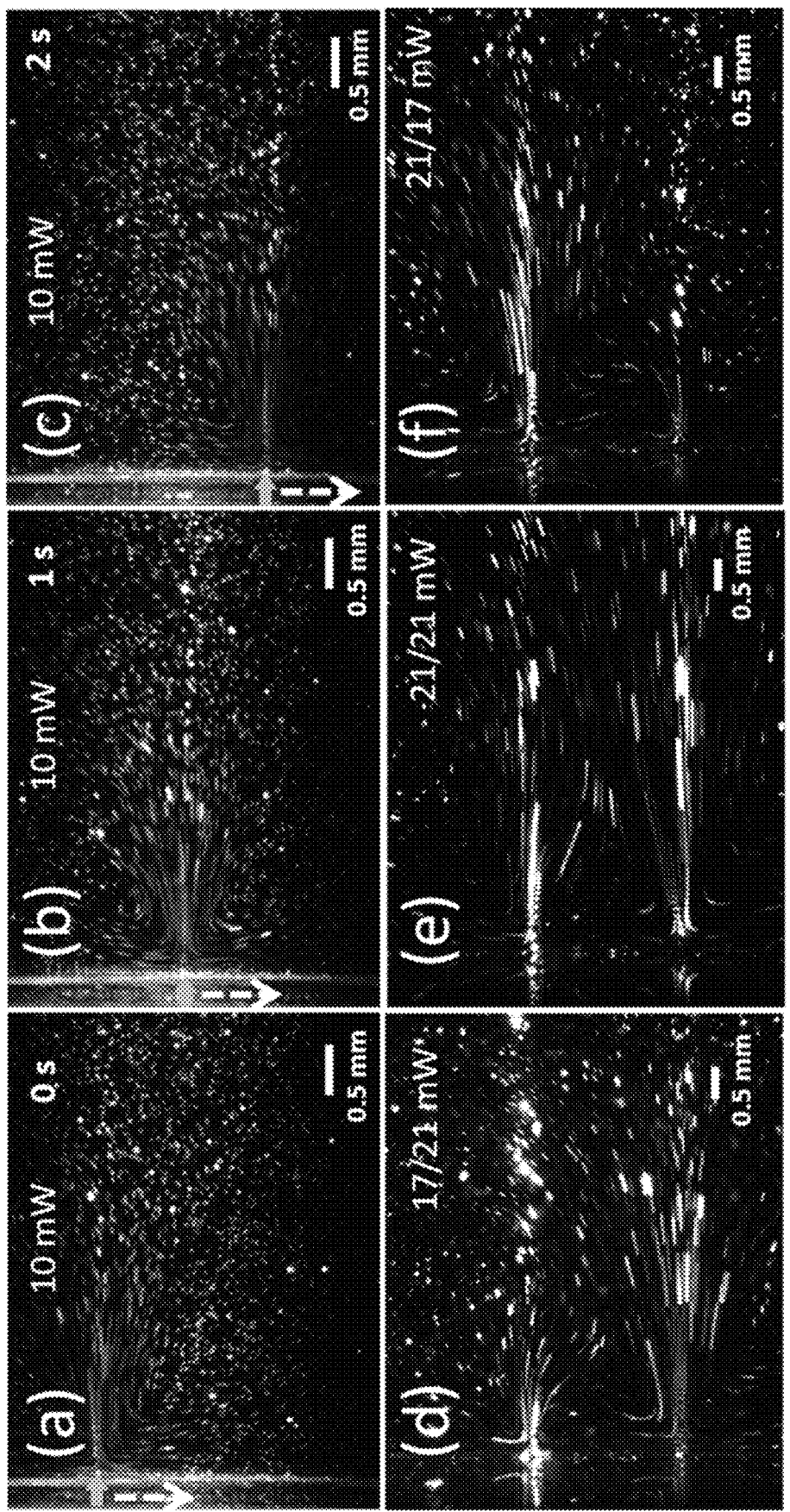
FIGS. 3A-F

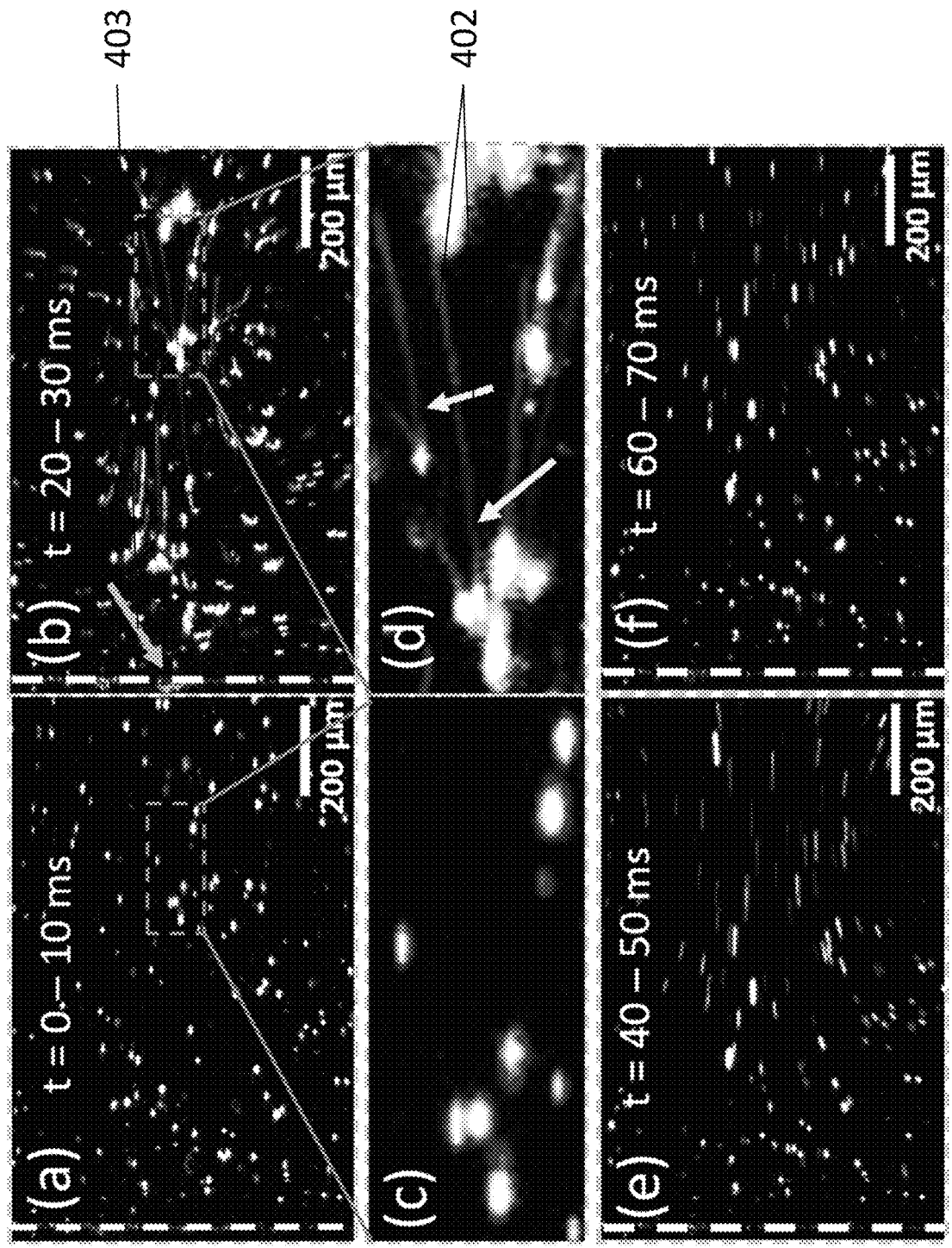
FIGS. 4A-F

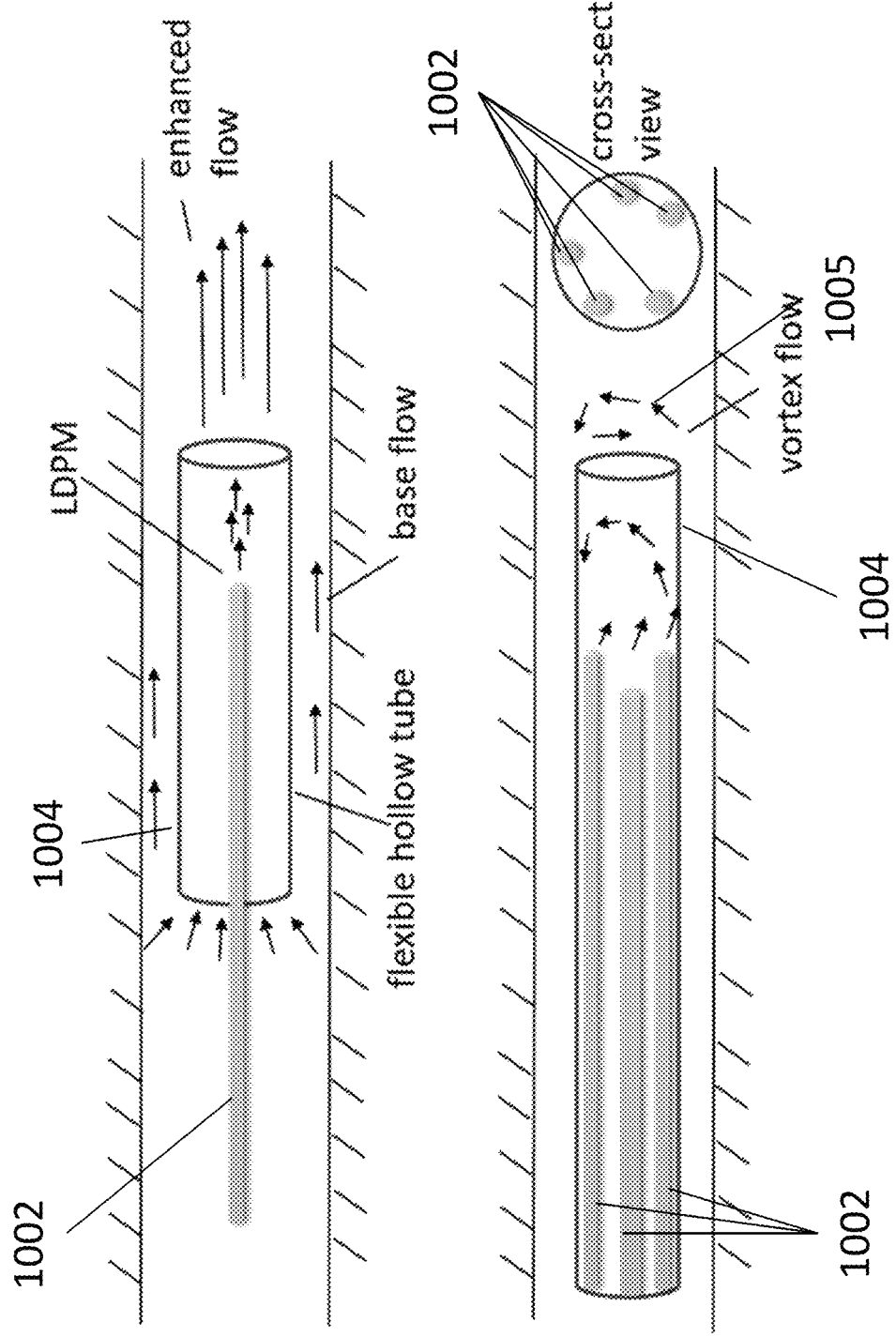

APPARATUS AND METHODS FOR MEDICAL APPLICATIONS OF LASER DRIVEN MICROFLUID PUMPS

CROSS REFERENCE TO RELATED APPLICATIONS

The present application is a U.S. National Stage Application filed under 35 U.S.C. § 371(a) claiming the benefit of and priority to International Patent Application No. PCT/US20/33823, filed May 20, 2020, which claims the benefit of and priority to to U.S. Provisional Patent Application Ser. No. 62/852,485, filed on May 24, 2019, the entire contents of which is incorporated by reference herein.

GOVERNMENT SUPPORT

This invention was made with government support under EEC1530753 awarded by the National Science Foundation. The government has certain rights in the invention.

TECHNICAL FIELD

The present application relates to apparatus and methods for medical applications of laser driven microfluid pumps, and in particular, to medical applications of laser-driven photoacoustic microfluid pump.

SUMMARY

This disclosure relates to apparatus and methods for medical applications of a laser-driven photoacoustic microfluid pump. In accordance with aspects of the present disclosure, an apparatus for drug delivery is presented. The apparatus includes a laser-driven photoacoustic microfluid pump (LDMP); a fiber optic element including a first end and a second end, the first end disposed on the LDMP; and an open tube capillary including a first end and a second end; the first end disposed on the fiber optic element, the open tube capillary configured to store a drug. The LDMP is configured to generate a directional fluidic jet from the drug and to deliver the drug.

In an aspect of the present disclosure, the LDMP may include a substrate having a first side and a second side, and a layer of photoacoustic material disposed on the first side of the substrate. The layer of photoacoustic material may be configured to generate a directional ultrasound wave in response to a laser beam impinging on the layer. The photoacoustic layer may include nanoparticles.

In accordance with aspects of the present disclosure, an apparatus for cutting tissue is presented. The apparatus includes a laser-driven photoacoustic microfluid pump (LDMP); a fiber optic element including a first end and a second end, the first end disposed on the LDMP; and a fluid including water, blood, plasma, and/or body fluid. The fiber may be disposed in the fluid. The LDMP may be configured to generate a fluidic jet from the fluid and to cut tissue.

In an aspect of the present disclosure, the LDMP may include a substrate having a first side and a second side, and a layer of photoacoustic material disposed on the first side of the substrate. The layer of photoacoustic material may be configured to generate a directional ultrasound wave in response to a laser beam impinging on the layer. The photoacoustic layer may include nanoparticles.

In accordance with aspects of the present disclosure, an apparatus for power washing depositions in an artery includes a laser-driven photoacoustic microfluid pump (LDMP), and an optical fiber including a first end and a second end. The first end is disposed on the LDMP. The second end is configured to be disposed in an artery. The artery includes a fluid. The fluid includes water, blood, plasma, and/or body fluid. The LDMP may be configured to generate a fluidic jet from the fluid and remove depositions from the artery.

In an aspect of the present disclosure, the LDMP may include a substrate having a first side and a second side, and a layer of photoacoustic material disposed on the first side of the substrate. The layer of photoacoustic material may be configured to generate a directional ultrasound wave in response to a laser beam impinging on the layer. The photoacoustic layer may include nanoparticles.

In accordance with aspects of the present disclosure, a method for drug to tissue delivery is presented. The method includes generating a directional ultrasound wave, based on directing a laser beam at a laser-driven photoacoustic microfluid pump (LDMP); thermally expanding and contracting the photoacoustic layer in response to the laser beam striking the photoacoustic layer; and generating a directional fluidic jet in a medium. The LDMP includes a substrate having a first side and a second side, and a layer of photoacoustic material disposed on the first side of the substrate. The layer of photoacoustic material is configured to generate a directional ultrasound wave in response to a laser beam impinging on the layer. The photoacoustic layer includes nanoparticles. The medium includes a drug stored in an open tube capillary which includes a first end and a second end. The first end disposed on the LDMP. The open tube capillary configured to store the drug.

In accordance with aspects of the present disclosure, apparatus for increasing flow rate from a laser-driven photoacoustic microfluid pump (LDMP), is presented. The apparatus includes an LDMP; a fiber optic element including a first end and a second end, the first end disposed on the LDMP; a tube with one end of the fiber optic element inserted therein; and a fluid including water, blood, plasma, and/or body fluid. The fiber optic element is disposed in the fluid. The LDMP is configured to generate a strong fluidic jet avoiding back flow.

In accordance with aspects of the present disclosure, a method for precisely manipulating a cell is presented. The method includes grasping a cell by using a fluid tweezer, the fluid tweezer includes a two directional laser-driven photoacoustic microfluid pump (LDMP). The method further includes thermally expanding and contracting the layer of photoacoustic material in response to the laser beam striking the layer of photoacoustic material and generating two directional fluid jets in a medium. The medium includes a cell to be manipulated by the fluid tweezer.

In an aspect of the present disclosure, the two directional LDMP may include an optical fiber light bending unit, including a first end and a second end and a layer of photoacoustic material disposed on the second end of the optical fiber. The layer of photoacoustic material may be configured to generate a directional ultrasound wave in response to a laser beam impinging on the layer of photoacoustic material. The layer of photoacoustic material may include nanoparticles In accordance with aspects of the present disclosure, a method breaking a cerebral thrombosis is presented. The method includes generating a directional high-speed flow, based on directing a laser beam at a laser-driven photoacoustic microfluid pump (LDMP). The method further includes thermally expanding and contracting the layer of photoacoustic material in response to the laser beam striking the layer of photoacoustic material and generating a directional fluidic jet in cerebrovascular to a cerebral thrombosis.

In an aspect of the present disclosure, the LDMP may include an optical fiber including a first end and a second end, and a layer of photoacoustic material disposed on the second end of the optical fiber. The layer of photoacoustic material may be configured to generate a directional ultrasound wave in response to a laser beam impinging on the layer. The layer of photoacoustic material may include nanoparticles.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which:

FIGS. 1A-G depict an Au-ion-implanted quartz window and jets launched from the window, in accordance with aspects of the present disclosure;

FIGS. 2A-D is a Jet-stream pattern by micropumps under different laser powers and spot sizes, in accordance with aspects of the present disclosure;

FIGS. 3A-F depict a moving micropump and double micropumps, in accordance with aspects of the present disclosure;

FIGS. 4A-F depict the creation of a jet by a single laser pulse, in accordance with aspects of the present disclosure;

FIGS. 10A-C are illustrations of catheter-based fluid pumps, in accordance with aspects of the present disclosure;

Figure 1A:
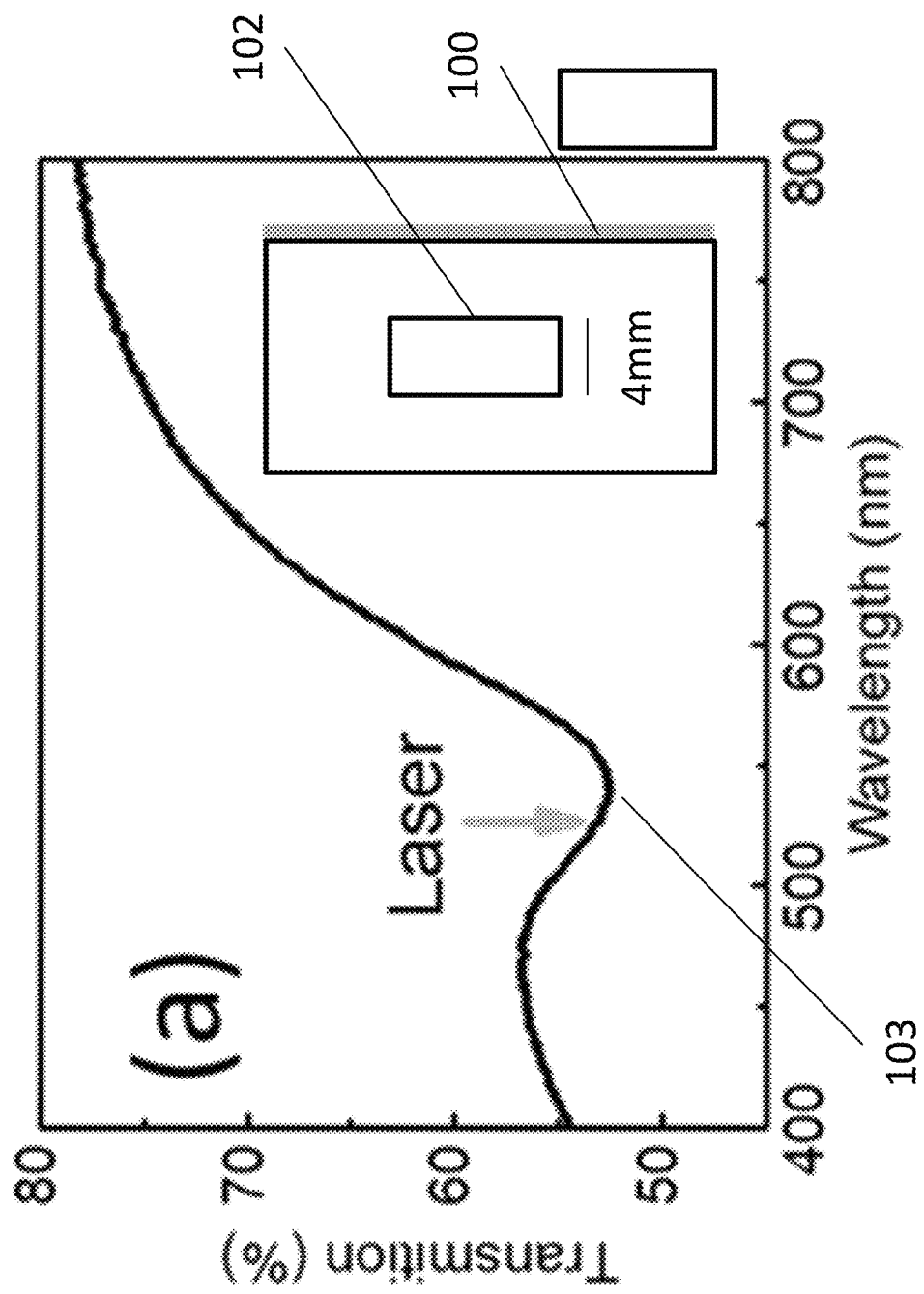

Further details and aspects of various embodiments of the present disclosure are described in more detail below with reference to the appended figures.

DETAILED DESCRIPTION

This disclosure relates to apparatus and methods for medical applications of a laser-driven photoacoustic microfluid pump (LDMP).

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The process of converting (or transforming) one form of energy into another is often referred to as transduction. A transducer is a device that is typically employed to perform such a function, and transducers can be characterized by the direction in which the physical system (e.g., pressure, temperature, sound waves, etc.) passes through them. For example, a sensor is a type of transducer that receives and responds to a signal/stimulus from a physical system (e.g., temperature) and produces an electrical signal that represents information about the physical system. An actuator, on the other hand, is a transducer that controls/generates a physical system (e.g., sound waves), in response to some electrical signal. For example, a speaker transforms an electrical signal of a recording to mechanical sound waves.

As noted above, one form of energy can be transformed into another. These energy forms may include, for example, mechanical, electrical, chemical, electromagnetic, thermal, and acoustic energy. Research has been conducted to explore transforming other forms of energy, such as transforming light energy (e.g., high-energy photons) to mechanical energy. Transforming light energy into some form of mechanical energy requires efficient momentum transfer, and that is difficult to attain. An efficient system that can perform such a transformation is desired.

Based on their operating principle, micropumps can be divided into two groups: mechanical and nonmechanical. Developed in the 1980s with the emergence of microelectromechanical systems, a mechanical micropump is a miniaturized version of a macroscopic pump, made of moving parts such as valves and membranes that can displace fluid directly. Although nonmechanical micropumps have no moving parts, they still require carefully fabricated microstructures and electrical contacts to generate thermal, electrical, magnetic, or acoustic stimulus to drive the fluids. While the performance of micropumps improved as the fabrication technique evolved, the principle and design of micropumps have remained almost the same over past decades. In various embodiments, the micropump has no moving parts or electrodes, thus requires no micro- or nanofabrication. The size, number, location, and timing of the micropumps may be remotely controlled, reconfigured, and programmed in real-time. The pump may include a semitransparent plasmonic quartz window. The pump may be based on the principle of photoacoustic laser streaming: an ultrasound wave generated by a resonant laser pulse drives fluid through acoustic streaming. The whole surface of the quartz window may be covered with a plasmonic layer. An ultrasound wave can be generated from any point on the window, making it a micropump launch pad.

With reference to FIGS. 1A-D, an Au-ion-implanted quartz window 100 and jets launched from the window are shown. FIG. 1A depicts the UV-visible absorption spectrum of the Au-ion-implanted quartz window 100.

The photoacoustic launch pad may be created by Au ion implantation in a 0.5-mm-thick quartz window 100 at about 60 keV to a dose of about $6 \times 10^{16}$ per cm square. Based on the chosen acceleration voltage, the Au ions may be implanted within about 50 nm below the surface. A relatively high dose may be used so that a sufficient Au nanoparticle concentration and corresponding optical absorption can be obtained. FIG. 1A also shows a diagram of the quartz window 100 with the implanted region 102 in the center of the quartz window 100. The absorption spectrum in FIG. 1A indicates a peak absorption 103 near 530 nm due to surface plasmon resonance of Au clusters and nanoparticles.

Figure 1B:
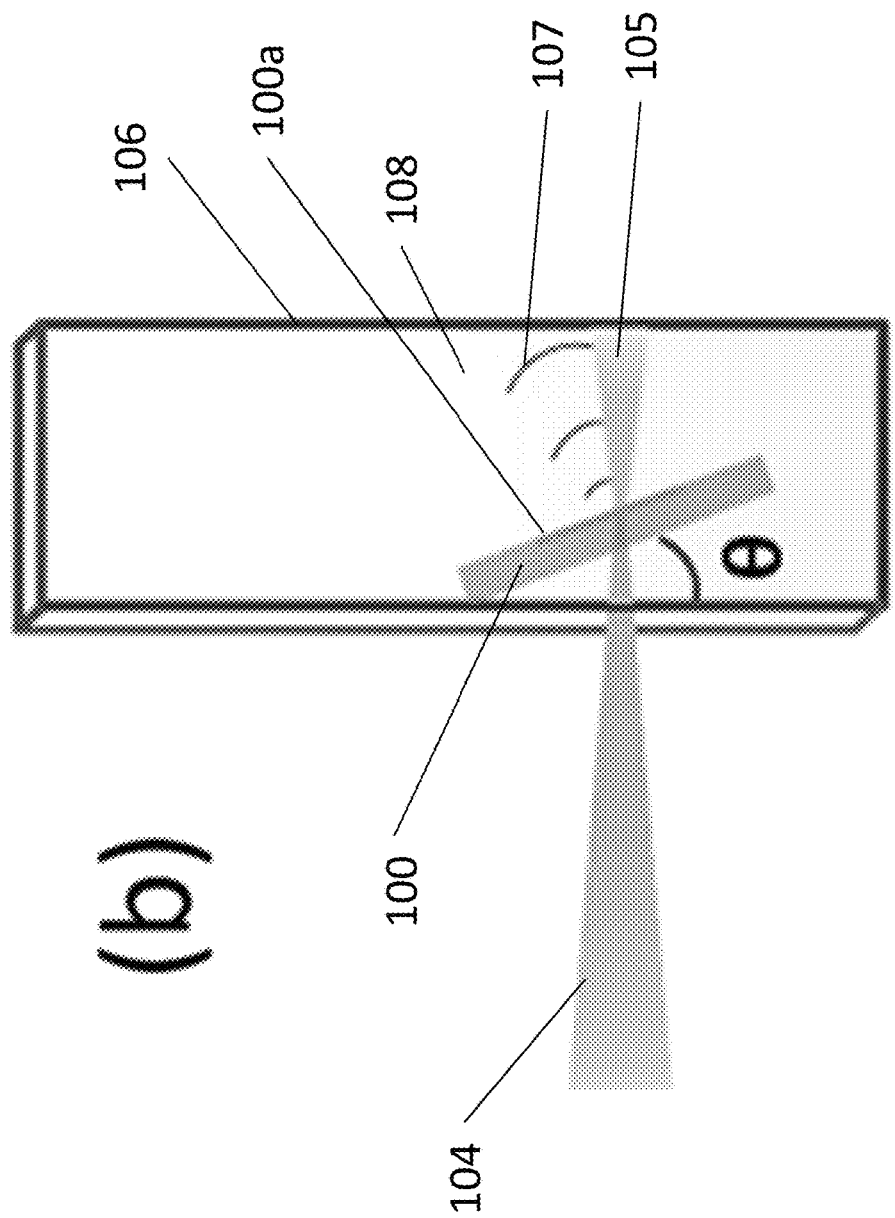
Figure 1C:
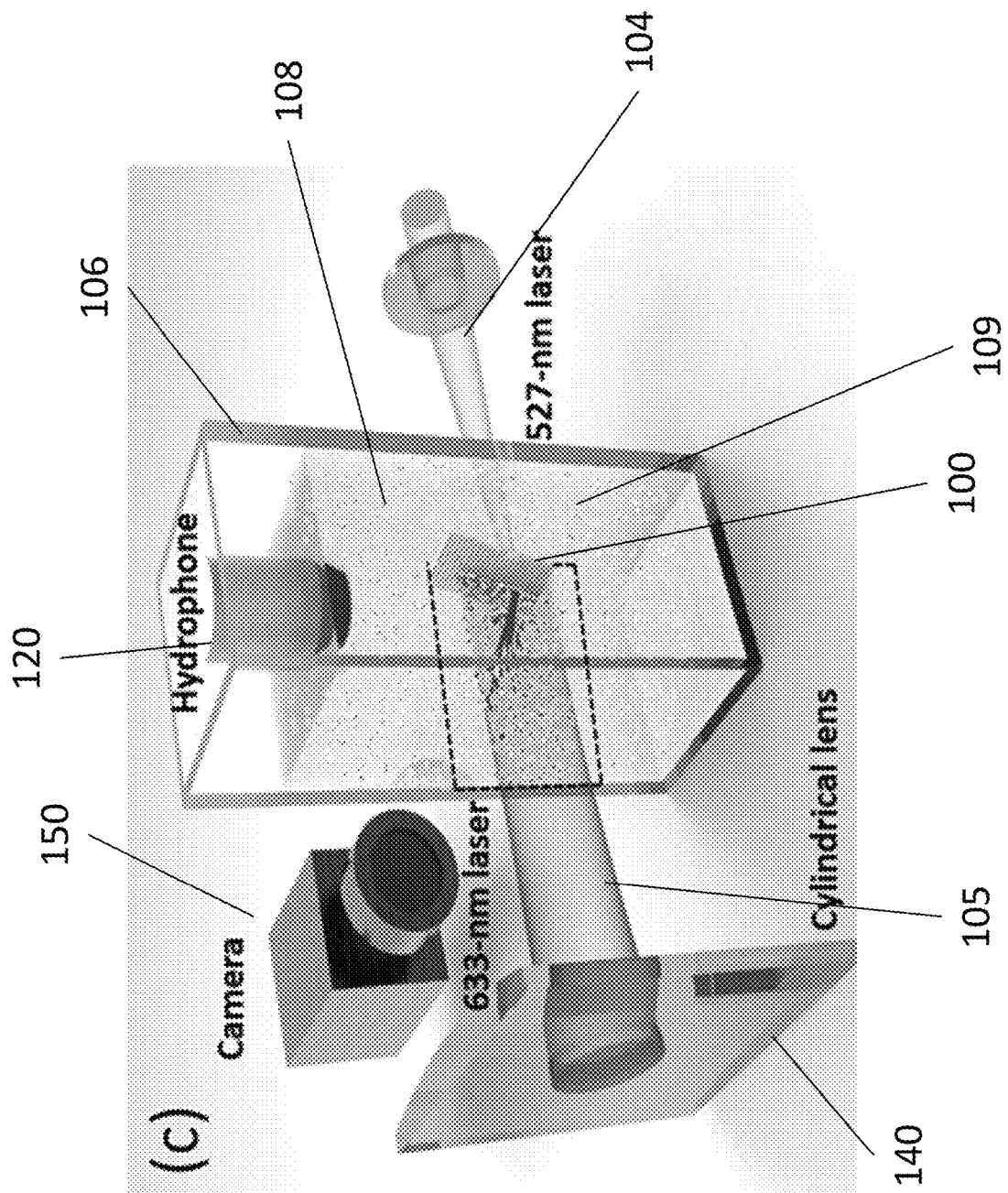

FIGS. 1B and 1C illustrate a setup to generate jets at different angles between an excitation laser beam and the Au-ion-implanted quartz window.

A hydrophone is a microphone designed to be used underwater for recording or listening to underwater sound. Most hydrophones are based on a piezoelectric transducer that generates an electric potential when subjected to a pressure change, such as a sound wave To use the window as a micropump launch pad, for example, a cuvette 106 may be filled with the deionized water 108 without Au nanoparticles. The quartz 100 may be placed in the cuvette 106 (e.g., a 1-cm square glass cuvette) with a tunable tilt angle. A pulsed laser 104 (e.g., a 527-nm pulsed laser with a 150-ns pulse width) may be focused (10-cm focal length lens) on the quartz window 100 instead of the cuvette wall to generate photoacoustic waves 107 and photoacoustic jets. Red fluorescent polymer microspheres 109 and a laser (e.g., a 633-nm HeNe laser) may be used to image the motion of water 108 with a high-speed color camera 150. Photoacoustic waves 107 may be detected by a hydrophone 120, and then amplified by a preamplifier before being recorded by a high-speed oscilloscope. A long-pass filter may be used to block 527-nm light for flow imaging. The laser repetition rate may be about 1,000 Hz. Micropumps are ready to work when the jets are created by incident laser pulses from an arbitrary point on the window.

FIGS. 1D-G depict snapshots of jets at the incident angles of 0°, 30°, 40°, and 50°. Dashed lines indicate the window surface 100a in contact with water. The horizontal rays 170 are laser beams due to fluorescence from microspheres under about 527-nm green light excitation. The jets launched by this micropump from the quartz window 100 (FIG. 1B) always flow normal to the window surface regardless of the direction of laser beams. A simple conclusion from this observation is that the jets are not driven by momentum transfer from incident photons. Because the laser-induced heating and subsequent photothermal expansion of the Au-implanted quartz layer do not depend on the angle of incident lasers, the observation of jets perpendicular to the surface agrees with the mechanism of photoacoustic streaming and does not contradict previous observations. On the other hand, this window-jet relationship allows for the micropump to pump fluids in the same direction without worrying about the direction of a laser beam. The direction of pumping may be changed with the direction of the window 100 (FIG. 1B).

With reference to FIGS. 2 A-D, a jet-stream pattern by micropumps under different laser powers and spot sizes are shown. FIGS. 2 A-C Laser spot size of 50-μm diameter and laser power of (A) 6.3 mW, (B) 10 mW, and (C) 40 mW. FIG. 2D shows a laser power of 330 mW and spot size of about 300 μm×50 μm.

There is a threshold of laser power to initiate a jet. This is confirmed by observations shown in FIGS. 2A-C. No streaming was observed at a low power of 6.3 mW, but substantial streaming can be seen at a power of 10 mW, and becomes even stronger at 40 mW. First, from FIGS. 2B and 2C, it can be seen that jet speed is a factor: Jets with high speeds start off with a smaller initial diameter and are less divergent as they move forward. Second, a large laser spot or micropump, as indicated by a wide yellow fluorescence path in FIG. 2D, can make a jet less divergent and more collimated in the far-field, but the initial jet size can still be as small as in FIG. 2C. These observations can be roughly understood from the stream-lines of the jets as well as the interplay between fluid mass conservation, inertia, and acoustic radiation forces. When a fast jet is launched from the window, the water must be supplied from its surrounding region, which makes the jet originate from the center of a laser spot and have an initial size much smaller than the laser spot. Once the jet leaves the window, its motion is governed by the inertia of the fluid and acoustic radiation forces. Because a larger laser spot produces a more collimated ultrasound wave, the streaming becomes less divergent.

With reference to FIGS. 3A-C, snapshots of streaming at 0, 1, and 2 sec when a laser beam is moving downward at a speed of ~1 mm/s are shown. The horizontal arrows indicate the positions of laser spots, and the vertical arrows show the laser spot's velocity direction. FIGS. 3D-F Streaming by two laser beams with different up/down laser powers.

The instantaneous action of a micropump without photoacoustic cavity preparation allows unprecedented freedom to create micropump patterns and various fluid movements. For example, a sweeping micropump may be created as a laser beam is swept (FIGS. 3A-C). Because of the inertia of the fluid, a moving jet cannot reach as far as a steady jet does. To generate two micropumps/jets at the same time, the beam is split into two. FIGS. 3D-F show that two jets are generated by two beams, and the strength of each jet can be independently controlled by each beam. However, due to proximity of the two jets, they either merge into a wider jet when both are equally strong (FIG. 3E), or a weaker jet is swallowed by a stronger one as in FIGS. 3D and 3F. If each jet is considered as one fountain, all kinds of dancing fountains may be formed simply by playing with laser beams.

With reference to FIGS. 4A-F the creation of a jet by a single laser pulse is shown. The long-pass filter was removed so that green light from laser pulses can also be observed. (FIGS. 4A, 4B, 4E, and 4F) Time-sequenced snapshots of fluid motion before and after a laser pulse. For example, exposure time is about 10 mS. The arrow 403 in FIG. 4B indicates the laser's focused spot on the quartz plate. The bright-white color of microspheres is due to strong fluorescence and CC saturation. (FIGS. 4C and 4D) Zoomed-in images of the regions indicated by boxes in A and B. Laser pulse energy: 0.5 mJ.

The on-demand jet generation and controlled generation of laser pulses further allow us to explore the mechanism of pumping by examining a single laser pulse's jet. FIG. 4 shows a sequence of high-speed images of fluid at every 20 ms before and after the striking of a laser pulse. It can be seen from FIG. 4A that the fluid is almost stationary initially. The fluid begins to move only after the arrival of a laser pulse, as indicated by the green color of some tracing particles in FIG. 4B. However, unlike movement near the window in continuous streaming, the water near the window remains motionless. The region with the highest fluid speed is about ~1 mm away from the window, as marked by the green box in FIG. 4B. FIGS. 4E and 4F further show that the fluid speed quickly decreases and becomes very small after 40 mS.

In addition to steady-state stream-lines and average flow speed, detailed inspection of the trajectories of tracing particles provides more information about the local instantaneous speed of particle along its trajectory. This is because, during the 10-ms exposure time for each image, the camera is constantly recording the position of particles. The fluorescent intensity of a pixel is proportional to the time a particle spends in one position. For a motionless particle, the fluorescent intensity of a pixel appears as a bright spot in the image. For a fast-moving particle, the trace is dimmer because of low exposure time. However, for a slowly moving particle, the trace appears brighter because of increased exposure time for each pixel. In principle, the integrated fluorescent intensity from a particle trajectory is the same no matter if it is moving or not because the total fluorescent- or scattered light is the same for the same exposure time. Such a correlation can be verified by trajectories in FIGS. 4A, 4E, and 4F. The tracer particles appear bright when they are not moving. Because of the decelerating stream in FIGS. 4E and 4F, the trajectories become dimmer at the left side (beginning) but brighter on the right side (end).

With reference to FIG. 4B, and especially at two trajectories indicated by arrows 402. The trajectories begin with green spots and bright red color, become dimmer in the first ⅕ of their paths (indicated by the tips of arrows 402), but after that, the trajectories become stronger and stronger. These color and intensity codes give us a vivid picture of the dynamics of a jet: The fluid begins to accelerate shortly after the strike of the laser pulse and quickly reaches its maximum speed, as revealed by a weaker trajectory. After that, the speed of fluid begins to decrease, as indicated by stronger trajectories. An ultrasound pulse will be generated immediately when the laser hits the quartz window, but it will take about 0.5µS to reach the two tracing particles. This time delay can be neglected compared with the 10-ms total exposure time. According to the principles of acoustic streaming, the volumetric force exerted on fluid is proportional to the ultrasound intensity and is in the same direction as ultrasound propagation. Because the ultrasound will last for about 0.5 ms, it is safe to assume that the fluid gets accelerated during this period and reaches the highest speed at the end of the ultrasound pulse. The damping of fluid begins after the passing of the ultrasound pulse, which is why the green laser is seen first, followed by a short period of acceleration, and then a longer period of deceleration.

Figures 5A, 5B:
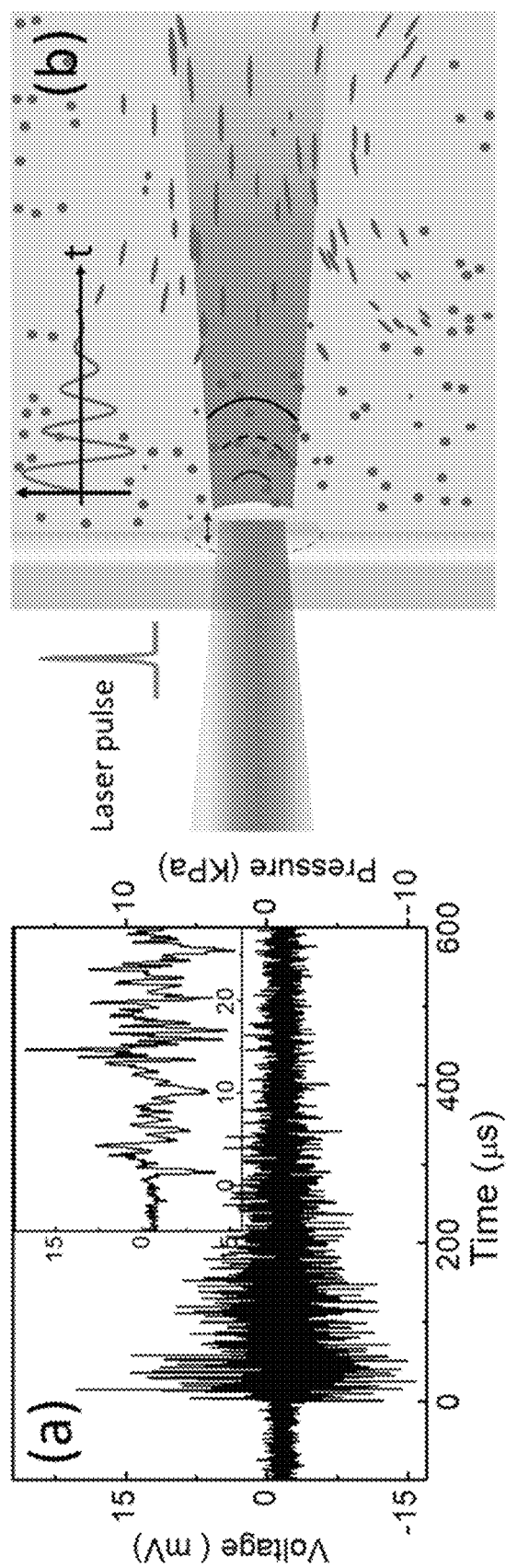
FIG. 5A depicts a long-lasting photoacoustic oscillation excited by a single laser pulse, in accordance with aspects of the present disclosure.
FIG. 5B depicts a schematic of photoacoustic wave and streaming, in accordance with aspects of the present disclosure.

With reference to FIGS. 5A and 5B, a diagram of a mechanism of photoacoustic micropumping, is shown. Typical long-lasting photoacoustic oscillation excited by a single laser pulse. The converted pressure from the hydrophone voltage signal is shown on the right axis. The hydrophone signal for the first 30 µS is shown in FIG. 5A. FIG. 5 B shows a schematic of a photoacoustic wave and streaming. The absorption of the incident laser makes the surface layer expand thermally and vibrate mechanically, leading to an ultrasound wave. The stream-lines of FIG. 5 B are based on FIG. 4E, about 20 ms after the laser pulse.

The mechanism is the same photoacoustic streaming as before except that Au nanoparticles/clusters are now embedded in the quartz surface layer instead of being attached to the cuvette cavity surface. Again, the key to the success of laser streaming is that a long-lasting ultrasound wave can be generated by a single laser pulse. Laser-induced heating and photothermal expansion of the embedded Au particles induce a stress inside the quartz plate and causes ultrasonic vibrations of the quartz plate. Such a local surface vibration and heating induce vibration of water in two directions: longitudinal vibration normal to the quartz surface and shear vibration parallel to the surface. However, the shear motion of the plate cannot be effectively propagated into the liquid because this motion decays exponentially in the liquid, and the penetration distance is typically less than 1 µm at room temperature. Only the longitudinal vibrations of the quartz plate can be effectively propagated through the liquid. This vibration induces a longitudinal ultrasonic wave in the liquid, leading to a liquid jet normal to the plate surface.

A laser-driven photoacoustic microfluid pump (LDMP) is made by ion implantation of gold atoms (or other metallic atoms) into a solid substrate such as quartz, glass, or other transparent materials. The substrate size can be small, for example sub-mm size. The Au may be implanted into a large thin substrate. Then the thin substrate may be diced into a small size LDMP.

The size of the system may also depend on the application. For example, for stomach lining endoscope operation, mm size may be used. For cardio artery application, sub-mm size may be used. This small LDMP may then be attached (mounted, glued, or fused) in contact with an optical fiber to bring the laser to the LDMP and produce a fluidic jet. Metal atoms may be implanted directly to the end of an optical fiber to make the end as the fluidic jet head whenever the laser is transported through the fiber to the head.

The fluid may include water, blood, plasma, body fluid, or any other fluid depending on medical or surgical applications. Jet cross-section is estimated to be 0.1 mm diameter or less with the velocity of the jet fluid up to a few cm/sec, depending on the power of the laser inducing the fluidic jet in the forward direction.

Figure 6:
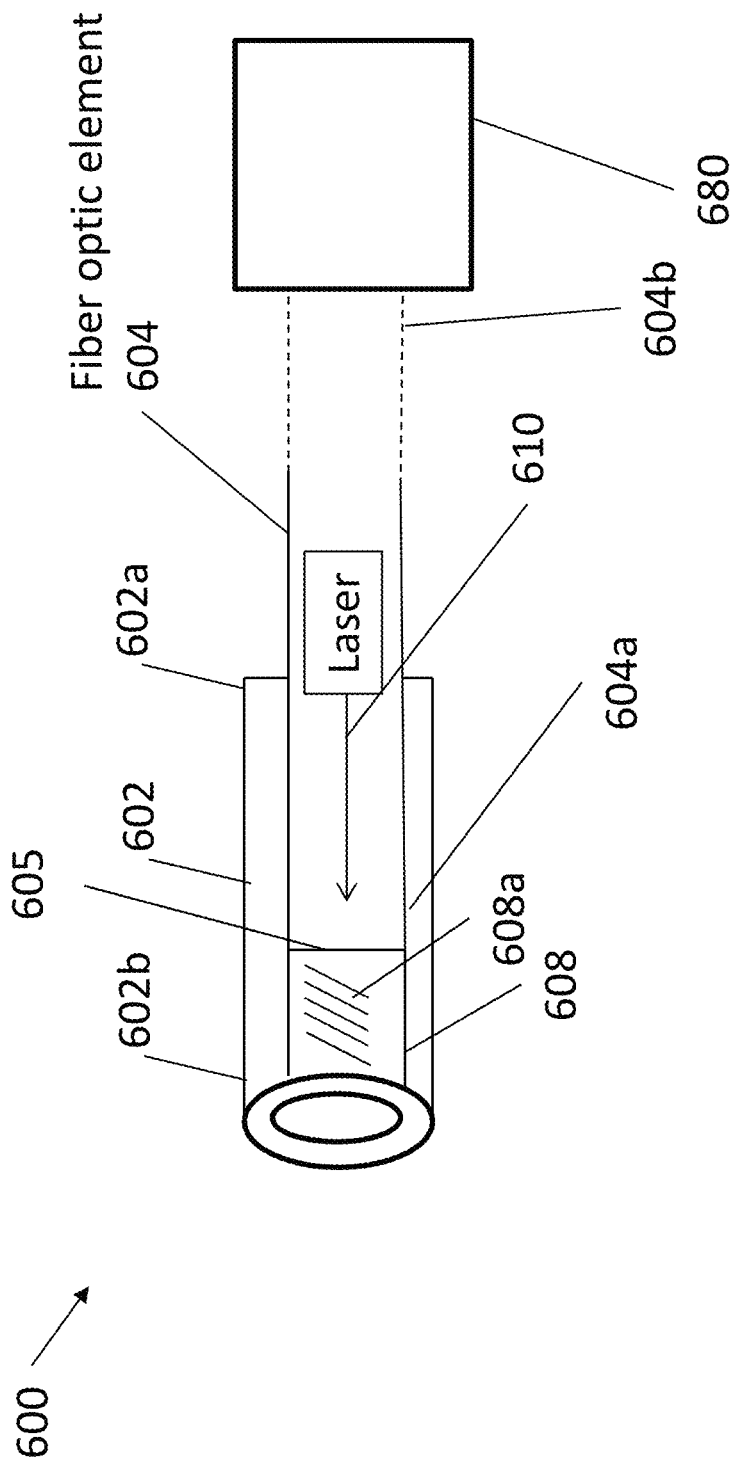
FIG. 6 is an exemplary embodiment of an apparatus for drug to tissue delivery, in accordance with aspects of the present disclosure.
Figure 7:
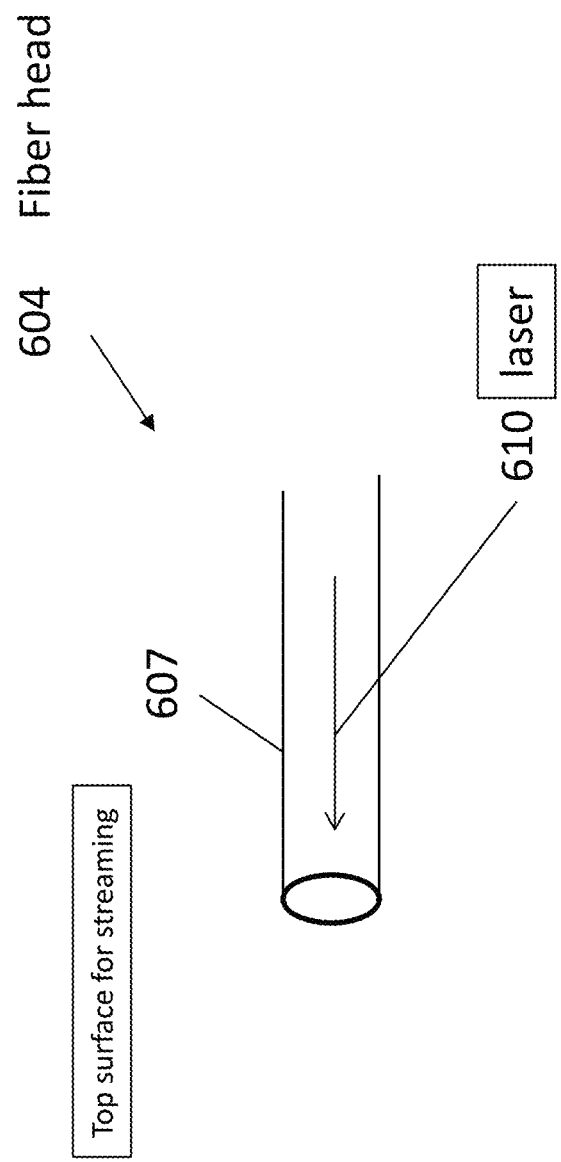
FIG. 7 is an illustration of a fiber optic element of the apparatus of FIG. 6.

With reference to FIG. 6, a drug to tissue delivery apparatus 600 is shown. The apparatus may include an LDMP 680, a fiber optic element 604, and an open tube capillary 602 disposed on the fiber optic element 604 or the LDMP 680. The fiber optic element 604 includes a first end portion 604a and a second end portion 604b. The first end portion 604a may be disposed on the LDMP 680. The open tube capillary 602 includes a first end portion 602a and a second end portion 602b. The first end portion 602a may be disposed on the fiber optic element 604. The open tube capillary may be configured to store a drug 608a in a reservoir 608. The LDMP 680 may be configured to generate a directional fluidic jet from the drug 608a and to deliver the drug 608a. it is contemplated that the fluidic jet may include gases and/or liquids, but preferably a liquid.

Drugs in a fluid form may be stored in the open tube capillary 602, with one end attached to LDMP 680. Liquid jets with a drug may be aimed at the target area for delivery. A target area may also be pre-drilled with a small cavity by laser beam before the fluidic jet drug delivery. In a case where the same laser can be used for drilling and for jetting, it may assist location alignment. For example, the size of the target area may be around 0.1 mm to 2 mm. It is contemplated that the laser may also be scanned into a larger area.

The fluidic jet stream may be used as a tool to cut tissue. The fluidic jet stream may puncture the thin membrane. The fluidic jet stream may be used to delaminate a thin layer of tissue membrane. The power may be adjusted to make the jet stream strong or weak. The fiber optic element 604 attached LDMP 680 may be combined with an endoscopic set. For example, the laserjet may be used to target and cut cancer cells by aiming the fluidic jet stream at the unwanted tissue.

The fluidic jet stream may be used to wash the inflamed tissues before drug delivery. The fluidic jet stream may be used as a miniature spade to loosen the plagues of unwanted deposition in the artery. When the fiber optic element 604 is nearly parallel to the artery, the jet stream direction will be glancing angle. A filter may be used to filter out the small plagues.

It is contemplated that the laser may be any wavelength in the range of approximately 180 nm-1 mm. The fiber may range in diameter between approximately a fraction of a micron to over several millimeters.

The fiber-based photoacoustic devices can perform drug delivery or other functions inside a human body. For example, the ultrasound of the fiber can make blood or body fluid circulate or move drugs around a tumor in the body. For example, the ultrasound may directly target some tissues such as kidney stones.

Figure 8A:
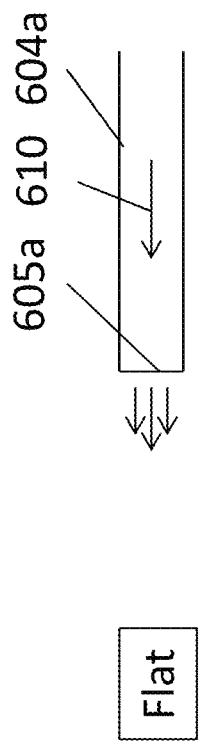
FIGS. 8A-C are an illustration of a flat, a convex, and a concave tip of the fiber optic element of FIG. 7.
Figure 8B:
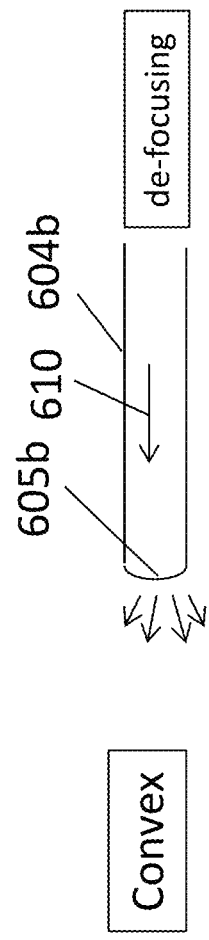
Figure 8C:
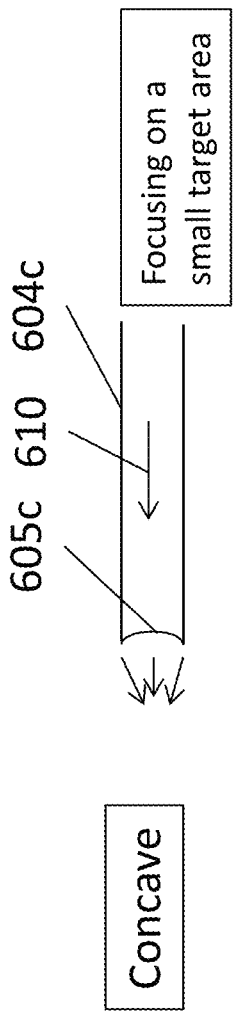

With reference to FIGS. 8A-C, the end surface 605 of the fiber optic element 604, may include flat 605*a*, dimpled (concave) 605*c*, or convex shapes 605*b*. For example, the convex shapes 605*b* may be used for defocusing the laser. The concave shape 605*c* may be used to focus the laser on a small target area.

Figure 9C:
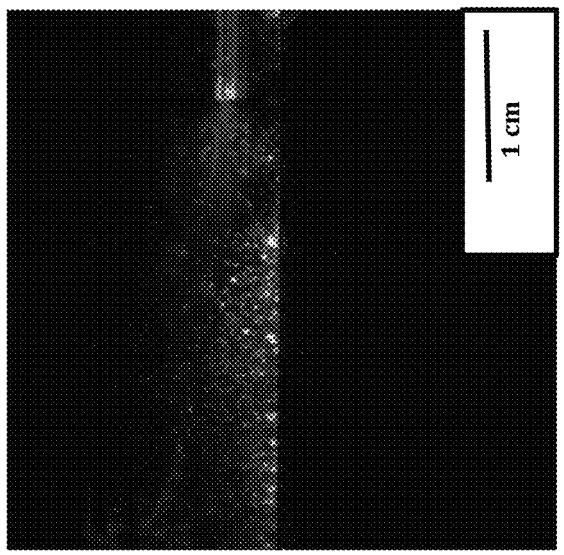
FIGS. 9A-C are images of laser streaming from a glass fiber, in accordance with aspects of the present disclosure.
Figure 9B:
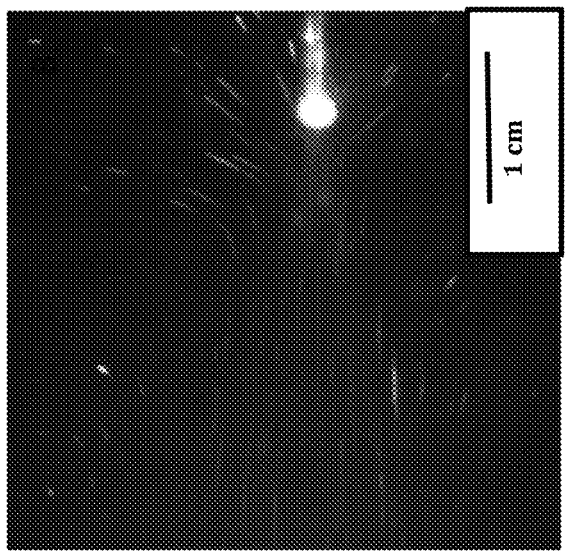
Figure 9A:
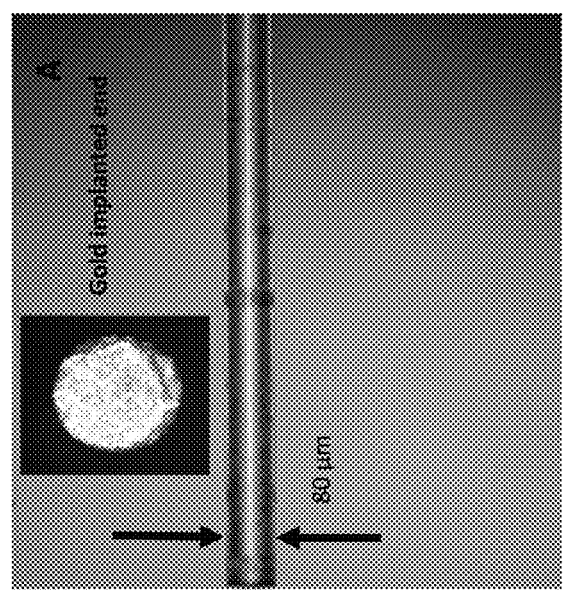

FIGS. 9A-C shows images of laser streaming from a glass fiber, in accordance with aspects of the present disclosure. FIG. 9A shows an experimental demonstration of laser streaming from a gold implanted glass fiber (d=80 µm). The surface of one end of the glass fiber is implanted with 60 KeV gold at the dose of approximately 2×1017/cm2 (FIG. 9A). The laser streaming occurs from the gold implanted one end of the glass fiber when the 10-15 mW pulse (150 nm) laser with the wavelength 527 nm hits the other end. (FIG. 9B). The laser streaming pushes particles in a glass tube. (FIG. 9C). These types of pumps will offer numerous advantages over other mechanical based pumps, including, but not limited to non-contact flow, thus reducing cell damage and thrombosis caused by traditional mechanical pumps; very small size and ability to drive fluid anywhere you can get laser energy, and/or no electrical or mechanical energy transmission needed to operate.

Figure 10C:
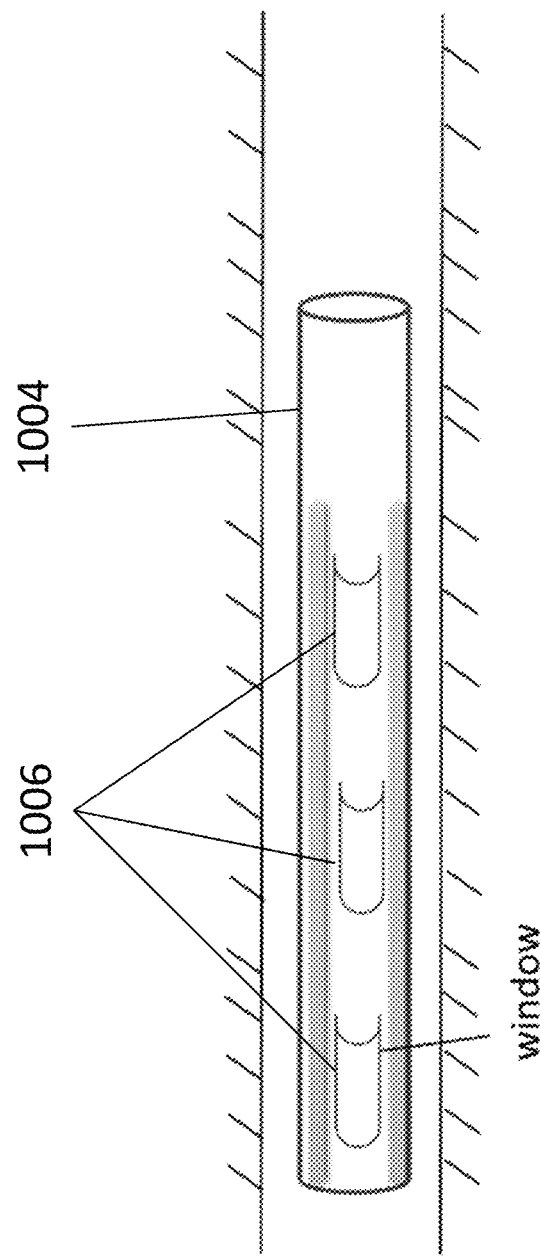

FIGS. 10A-C are illustrations of catheter-based fluid pumps, in accordance with aspects of the present disclosure. The use of laser light as a power source enables very flexible and small profile tools that could establish or enhance fluid flow in the body. These would operate similar to a "ramjet" engine where fluid is brought into a chamber in a hollow tube, and accelerated by LDMP pumps (e.g., single, multiple, and/or located in multiple parts of the lumen). This flow may be modified in multiple ways to enhance the efficacy of the application. For example, by providing a constant flow rate, with such flow rate adjusted by the amount of laser 1002 light (FIG. 10A). Pulsatile Flow could be created to simulate the physiological activity of the heart. This could be accomplished by cycling the laser 1002 on or off. In addition, ultrasonic or hypersonic flow cycles could also be created to enhance certain tool activities, such as dislodging thrombus. For example, multidirectional flows may be created by adjusting the direction of the laser 1002. This could include creating a vortex 1005 to enhance certain applications (FIG. 10B). It is contemplated that designs of these pumps may include various fluid inlets and outlets, and/or multiple windows 1006, to optimize for various applications (FIG. 10C). For example, a method for breaking a cerebral thrombosis may include generating a directional high-speed flow, based on directing a laser beam at an LDMP. The LDMP includes an optical fiber including a first end and a second end and a layer of photoacoustic material disposed on the second end of the optical fiber. The layer of photoacoustic material being configured to generate a directional ultrasound wave in response to a laser beam impinging on the layer. The layer of photoacoustic material may include nanoparticles. The method may further include thermally expanding and contracting the layer of photoacoustic material in response to the laser beam striking the layer of photoacoustic material and generating a directional liquid jet in cerebrovascular to a cerebral thrombosis.

Figure 11:
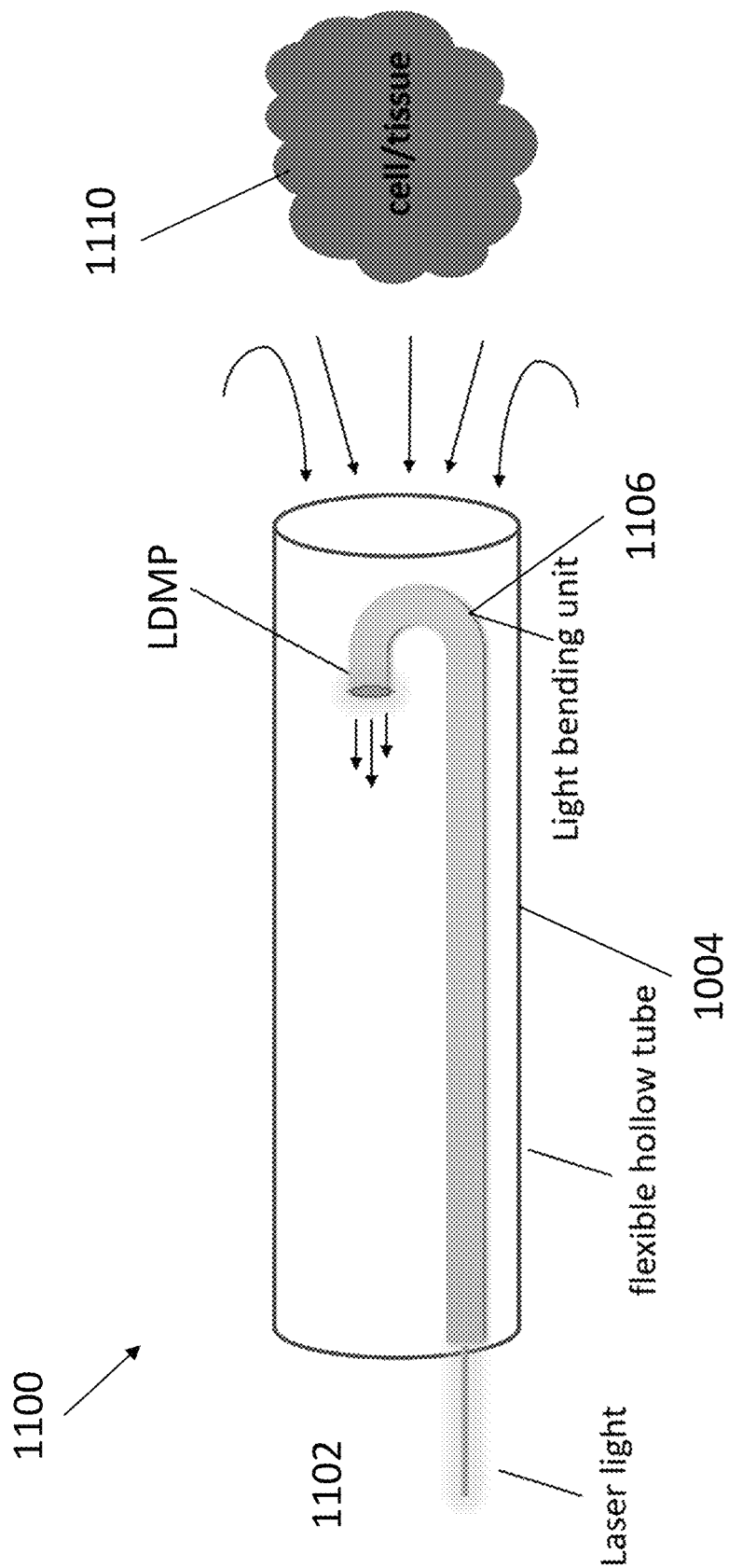
FIG. 11 is an illustration of a grabbing tool, in accordance with aspects of the present disclosure.

FIG. 11 is an illustration of a grabbing tool 1100, in accordance with aspects of the present disclosure. Flexible catheters 1106 may used where the flow is reversed in a hollow tube 1004, thus providing a suction capability (e.g., LDMP Suction Catheters). For example, the grabbing tool 1100 may be used to grab cells and/or tissue 1110. The grabbing tool 1100 may be used as very small and delicate suction tools that could be delivered in multiple parts of the body. Alternatively, the grabbing tool 1100 may be used in research to manipulate cells and/or tissues 1110, or even elements within cells.

For example, the grabbing tool can act as a fluid tweezer to manipulate a cells. The fluid tweezer may include an LDMP, which includes an optical fiber light bending unit, including a first end and a second end, and a layer of photoacoustic material disposed on the second end of the optical fiber. The layer of photoacoustic material may be configured to generate a directional ultrasound wave in response to a laser beam impinging on the layer of photoacoustic material. The layer of photoacoustic material includes nanoparticles. The layer of photoacoustic material may be thermally expanded and contracted in response to the laser beam striking the layer of photoacoustic material, which generates two directional fluidic jets in a medium (e.g., a liquid medium), which includes a cell to be manipulated by the fluid tweezer.

Figure 12:
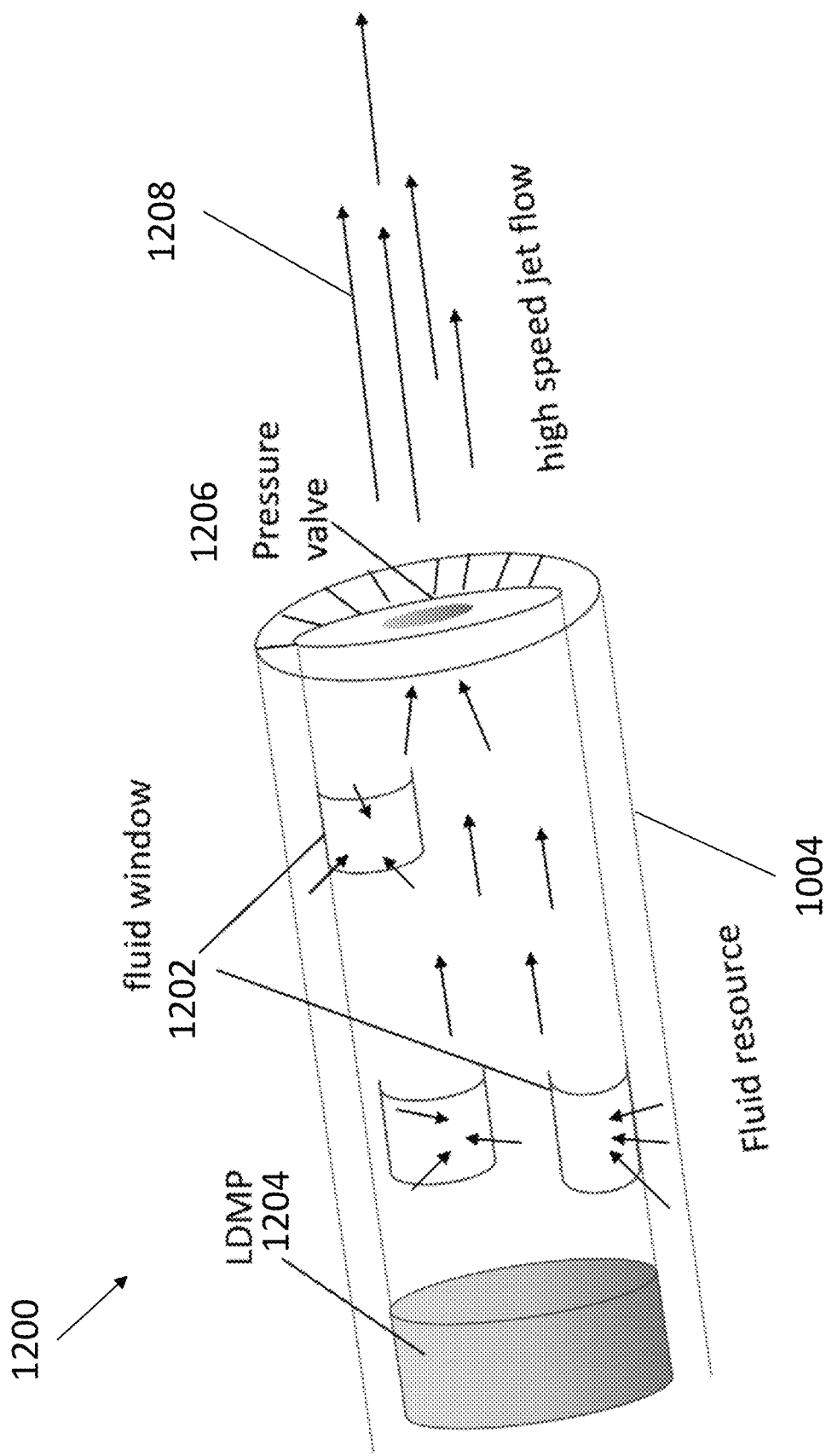
FIG. 12 is an illustration of a jetting and cutting tool, in accordance with aspects of the present disclosure.

FIG. 12 is an illustration of a jetting and/or cutting tool 1200, in accordance with aspects of the present disclosure. The jetting and/or cutting tool 1200 generally includes a flexible hollow tube 1004 configured as a fluid reservoir, an LDMP 1204, one or more fluid windows 1202, a pressure valve 1206, to generate a high-speed jet flow 1208. Jetting and/or cutting tools 1200 that use fluids accelerated by LDMP pumps ("LDMP Jet") would have advantages over existing "hydro jet" knifes because of their extremely small size and flexibility. Jetting and/or cutting tool 1200 may include the use of surrounding fluids, and/or chambered fluids. At very high flow rates, or at vibrating flow rates (e.g., high rates and high frequency), such tools could cut tissue or at small scales cellular structures.

Figure 13:
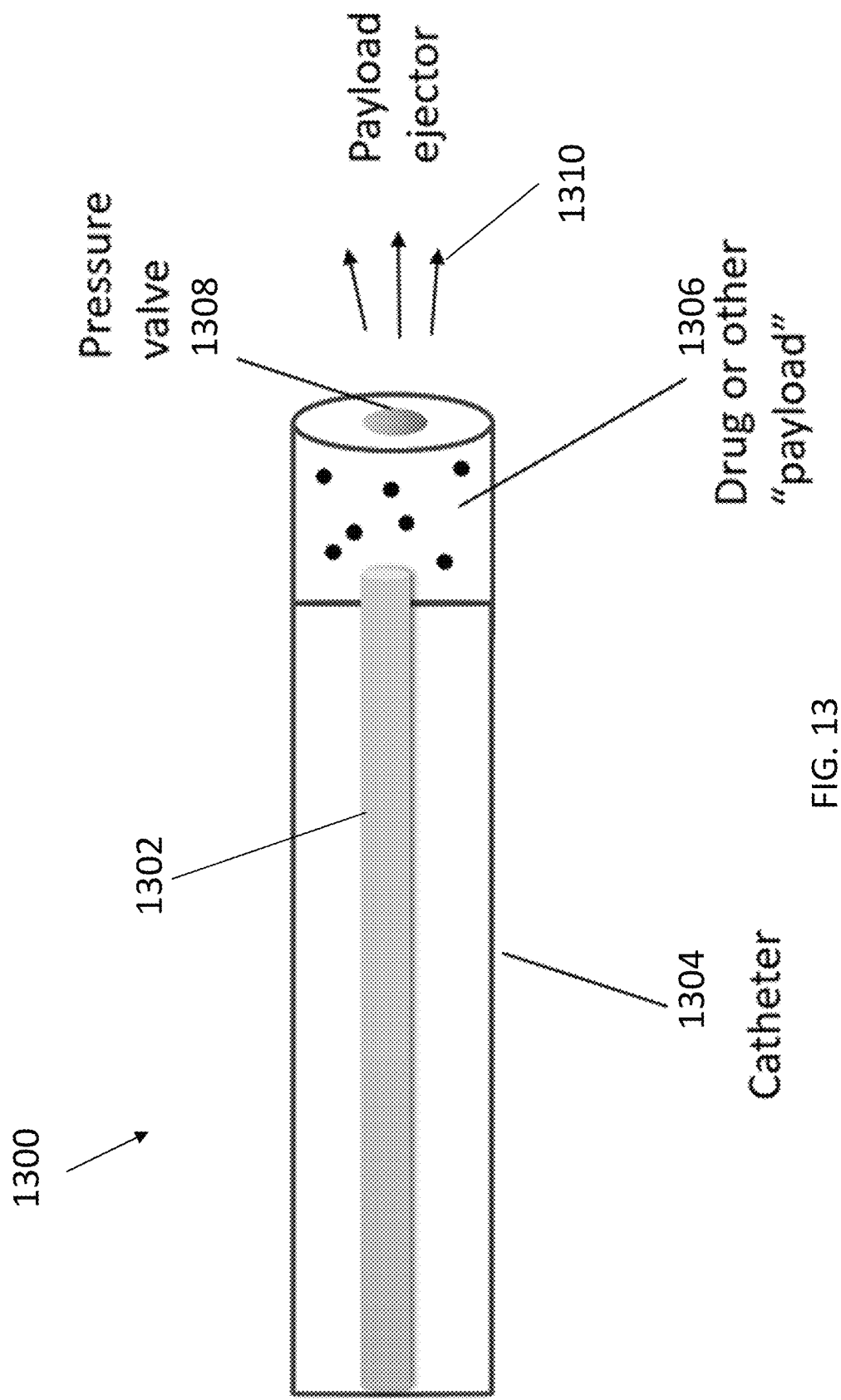
FIG. 13 is an illustration of a remote-controlled injector, in accordance with aspects of the present disclosure.

FIG. 13 is an illustration of a remote-controlled injector 1300, in accordance with aspects of the present disclosure. The remote-controlled injector 1300 generally includes a catheter 1304, disposed in the catheter 1304 is an LDMP 1302, a payload 1306 (e.g., a drug), and a pressure valve 1308 configured to regulate pressure, and a payload ejector 1310. Payloads 1306 may be encapsulated and then activated and actively pumped into regions of the body or cells. The remote-controlled injector 1300 may be used, for example, in cell therapy where delivery of certain agents needs to be done at a very small size, or in activities like in vitro fertilization, or gene therapy, small amounts of material could be injected into cells.

Figure 14:
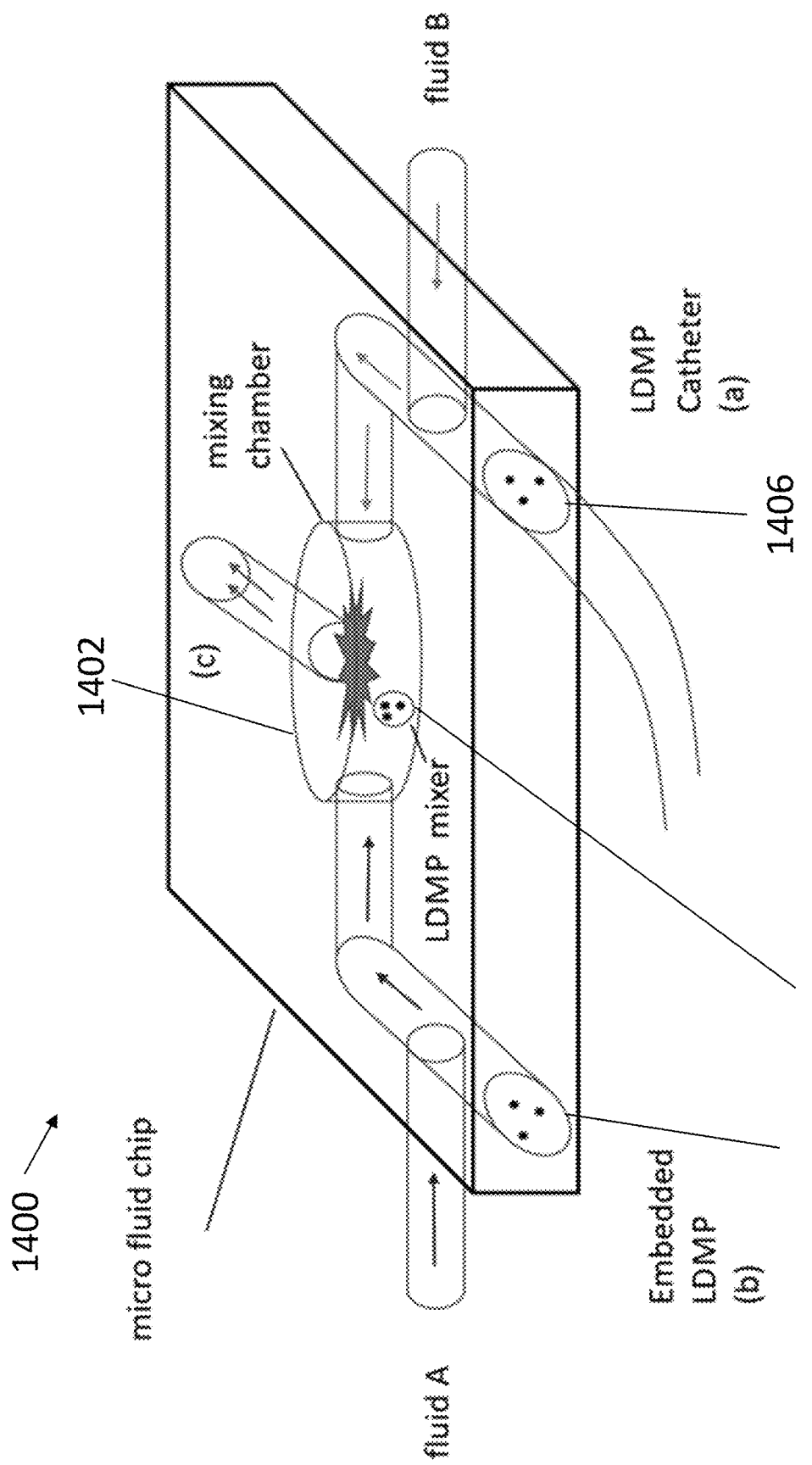
FIG. 14 is an illustration of a microfluid chip, in accordance with aspects of the present disclosure.

FIG. 14 is an illustration of a microfluid chip 1400, in accordance with aspects of the present disclosure. The microfluid chip 1400 may include a mixing chamber 1402, with an LDMP mixer 1404 for mixing two or more fluids. Microfluidics may be used in scientific research and drug development. LDMP pumps 1406 may create the movement of fluids in microfluidic circuits, for example, either through catheters (a) or embedded directly into the circuit (b). Mixing chambers could be used to enhance chemical reaction, with mixing induced by fluid flows induced by LDMP (c).

Figure 15:
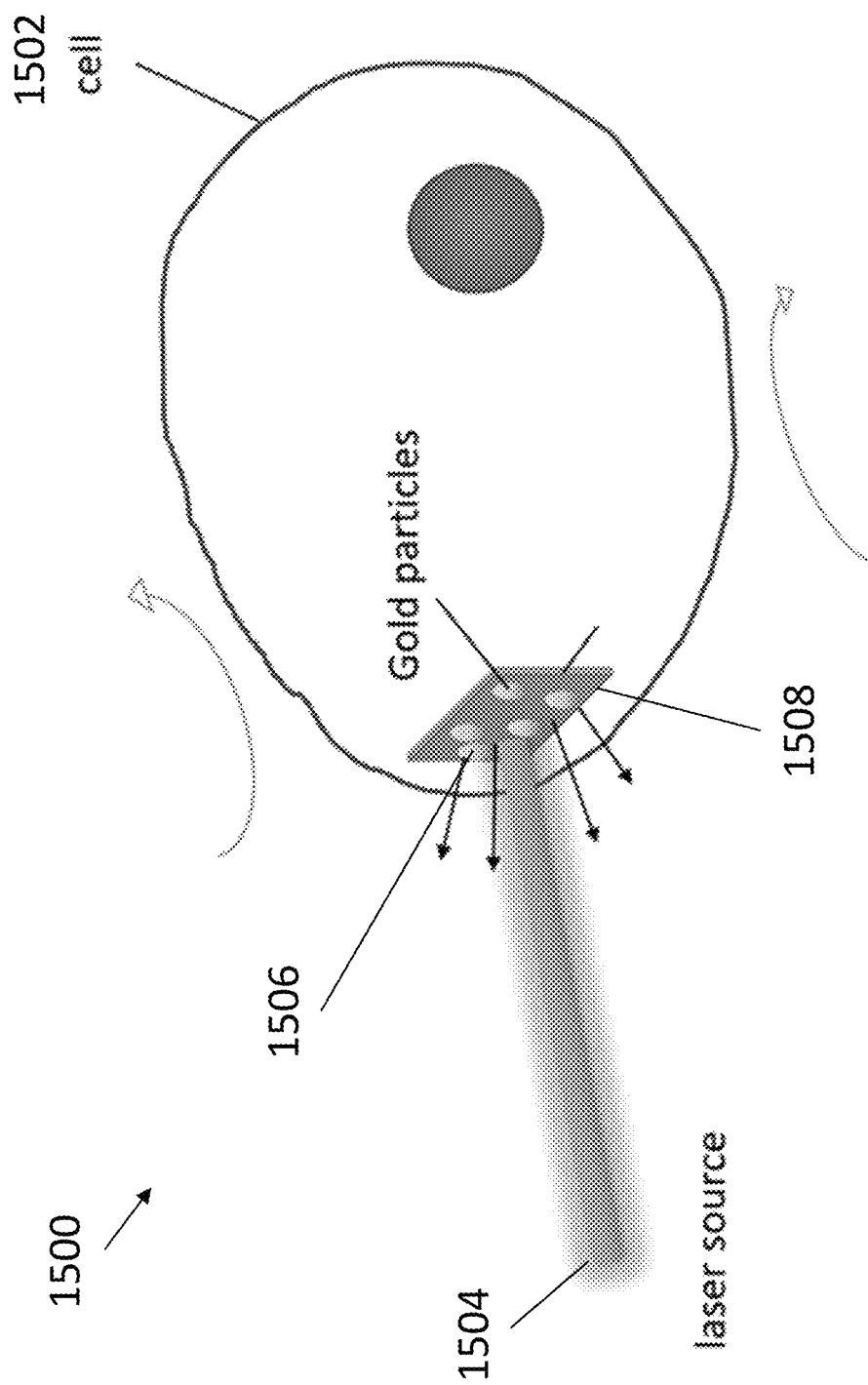
FIG. 15 is an illustration of a laser-driven photoacoustic microfluid pump synthetic cell, in accordance with aspects of the present disclosure.

FIG. 15 is an illustration of an LDMP synthetic cell 1502, in accordance with aspects of the present disclosure. By embedding gold particles 1506 into the lipid structure of a cell, an external laser 1504 may be used to move and manipulate these cells 1502.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached figures are presented only to demonstrate certain examples of the disclosure. Other elements, steps, methods, and techniques that are insubstantially different from those described above and/or in the appended claims are also intended to be within the scope of the disclosure.

What is claimed is:

1. A method for manipulating a cell, comprising: grasping a cell by using a fluid tweezer, the fluid tweezer including: a two directional laser-driven photoacoustic microfluid pump (LDMP) including an optical fiber light bending unit including a first end and a second end; thermally expanding and contracting a layer of photoacoustic material disposed on the second end of the optical fiber in response to the laser beam striking the layer of photoacoustic material; and generating two directional fluidic jets in a medium.

2. The method of claim 1, wherein the layer of photoacoustic material being configured to generate a directional ultrasound wave is in response to a laser beam impinging on the layer of photoacoustic material.

3. The method of claim 2, wherein the layer of photoacoustic material includes nanoparticles.

4. The method of claim 3, wherein the medium includes a cell to be manipulated by the fluid tweezer.

* * * * *